United States Patent
Horner et al.

(10) Patent No.: US 6,554,179 B2
(45) Date of Patent: Apr. 29, 2003

(54) REACTION BRAZING OF TUNGSTEN OR MOLYBDENUM BODY TO CARBONACEOUS SUPPORT

(75) Inventors: Mervyn H. Horner, Del Mar, CA (US); Paul W. Trester, Encinitas, CA (US); Peter G. Valentine, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/900,252

(22) Filed: Jul. 6, 2001

(65) Prior Publication Data

US 2003/0006269 A1 Jan. 9, 2003

(51) Int. Cl.$^7$ ............ B23K 31/02; H01J 35/08; H01J 35/10
(52) U.S. Cl. ............ 228/122.1; 228/121; 228/124.1; 228/124.5; 378/143; 378/144
(58) Field of Search .................. 228/122.1, 124.1, 228/121, 124.5; 378/133, 143, 144, 127

(56) References Cited

U.S. PATENT DOCUMENTS

| | | |
|---|---|---|
| 3,579,022 A | 5/1971 | Hennig et al. |
| 3,649,355 A | 3/1972 | Hennig et al. |
| 3,689,795 A | 9/1972 | Benesovsky |
| 3,710,170 A * | 1/1973 | Friedel ............ 378/125 |
| 3,723,076 A | 3/1973 | Benesovsky |
| 3,770,487 A * | 11/1973 | Gibson et al. ............ 376/414 |
| 3,821,579 A | 6/1974 | Burns |
| 4,132,917 A | 1/1979 | Bildstein et al. |
| 4,195,247 A * | 3/1980 | Hirsch ............ 252/512 |
| 4,394,953 A | 7/1983 | Sonnweber et al. ........ 378/143 |
| 4,516,255 A * | 5/1985 | Petter et al. ............ 313/311 |
| 4,731,116 A * | 3/1988 | Kny ............ 204/192.15 |
| 4,895,770 A * | 1/1990 | Schintlmeister et al. ............ 204/192.15 |

(List continued on next page.)

OTHER PUBLICATIONS

Valentine et al., *Boron carbide based coatings on graphite for plasma–facing components*, Journal of Nuclear Materials, 212–215 (1994), pp. 1146–1152.

(List continued on next page.)

Primary Examiner—Tom Dunn
Assistant Examiner—L. Edmondson
(74) Attorney, Agent, or Firm—Fitch, Even, Tabin & Flannery

(57) ABSTRACT

Reaction-brazing of tungsten or molybdenum metal bodies to carbonaceous supports enables an x-ray generating anode to be joined to a preferred lightweight substrate. Complementary surfaces are provided on a dense refractory metal body and a graphite or a carbon-carbon composite support. A particulate braze mixture comprising Hf or Zr carbide, Mo or W boride, Hf or Zr powder and Mo or W powder is coated onto the support surface, and hafnium or zirconium foil may be introduced between the braze mixture and the refractory metal body complementary surface. Reaction-brazing is carried out at or near the eutectic point of the components, which may be influenced to some extent by the presence of carbon and boride. Heating to about 1865° C. for a Mo/Hf combination creates a thin, dense, strong braze that securely joins the two bodies and creates a thin barrier of carbide and boride microphases near and along the interface with the carbon support that diminishes carbon diffusion into the metal body during extended exposures at elevated temperatures (above those presently used in x-ray tubes), even well above the eutectoid temperature.

20 Claims, 3 Drawing Sheets

U.S. PATENT DOCUMENTS

| | | | |
|---|---|---|---|
| 4,901,338 A | | 2/1990 | Rodhammer et al. |
| 4,990,402 A | | 2/1991 | Kneringer et al. |
| 5,102,747 A | * | 4/1992 | Kneringer et al. ........... 228/221 |
| 5,122,422 A | | 6/1992 | Rodhammer et al. |
| 5,204,890 A | * | 4/1993 | Anno et al. .................. 378/125 |
| 5,247,563 A | * | 9/1993 | Block et al. ................. 378/144 |
| 5,904,287 A | * | 5/1999 | Tashiro et al. ............ 228/124.1 |
| 5,943,389 A | * | 8/1999 | Lee ............................ 378/143 |

OTHER PUBLICATIONS

Valentine et al., *$B_4C$–SiC reaction–sintered coatings on graphite for plasma facing components*, Journal of Nuclear Materials, 220–222 (1995), pp. 756–761.

Valentine et al., *Carbon–Carbon and Graphite Brazing: Process Parameter Development and Braze–Joint Characterization*, $13^{th}$ Annual Conference on Composites, Materials and Structures, Jan. 1989.

Valentine et al., *A Laser Heating Method for Producing Reaction–Sintered Coatings on Carbon Substrates*, $16^{th}$ Annual Conference on Composites, Materials, and Structures, Jan. 1992.

\* cited by examiner

REACTION BRAZING OF TUNGSTEN OR MOLYBDENUM BODY TO CARBONACEOUS SUPPORT

This invention relates to the joining of dense bodies of refractory metal such as tungsten or molybdenum to carbonaceous bodies, and more particularly to the employment of reaction brazing at high temperature to join dense bodies of tungsten or molybdenum or alloys thereof to carbonaceous supports, such as graphite or carbon-carbon composites. Even more particularly, the invention relates to the reaction brazing of x-ray generating anodes made primarily of either molybdenum or tungsten, to graphite supports or to carbon matrix, carbon fiber-reinforced composite supports to produce assemblies suitable for use at high temperature in a vacuum environment where temperature cycling will be experienced and collectively would tend to result in undesirable chemical reactions, e.g. carbon diffusion from the support and formation of substantial metal carbide.

BACKGROUND OF THE INVENTION

There are various applications where it is desirable to attach a tungsten or molybdenum refractory body to a carbonaceous substrate in a manner so as to create an effective joinder that will remain satisfactory for extended periods in a high temperature environment, i.e. above 1000° C. and in certain instances above 1500° C. or even above 2000° C. One such use of such structures is in the field of rotating x-ray anodes, and U.S. Pat. No. 3,579,022 shows the creation of a rotary anode for an x-ray tube wherein a tungsten-rhenium alloy is bonded to a graphite base by first depositing a thin stratum of rhenium having a thickness of a few micrometers. In U.S. Pat. No. 3,649,355, a graphite base for a rotary x-ray anode is first plasma-sprayed with tungsten to produce a coating of substantially pure tungsten, or an alloy thereof with rhenium, osmium or the like. Thereafter, an outer layer of tungsten is preferably deposited from a gaseous phase using CVD or the like. In U.S. Pat. No. 3,689,795, a molybdenum or molybdenum alloy base having a thickness of about 6 millimeters is used, and a focal track of pure tungsten or a tungsten-rhenium alloy is applied thereto by chemical vapor deposition (CVD) or a like process. To improve the crack resistance of such a molybdenum base, it is suggested to form the base using powder metallurgical techniques from a mixture of metal powders so the base will contain from 50 to 500 ppm of boron.

U.S. Pat. No. 4,132,917 shows a graphite body which has a metal band brazed thereon for a focal track. Illustrated in the patent is the use of a molybdenum or molybdenum alloy layer which is contiguous with the graphite body, and a layer of a tungsten-rhenium alloy that is superimposed thereon. In one embodiment, a thin coating of titanium carbide is applied to the graphite by CVD before brazing a metallic ring of the desired shape using Ti or Zr foil or powder paste, which ring may be formed by a powder metallurgical process.

U.S. Pat. No. 4,516,255 discloses the use of a rotating x-ray anode made from a molybdenum alloy containing some carbon, such as TZM, which is provided with a focal path of tungsten or a tungsten alloy. Using plasma spraying or the like, an oxide coating, such as titanium oxide, is formed on the TZM body, preferably after an intermediate layer of molybdenum (Mo) or tungsten (W) having a thickness between 10 and 200 μm has been applied by plasma spraying or the like.

U.S. Pat. No. 4,990,402 teaches joining a metal part to a fiber-reinforced pyrolytic graphite structure or the like such as a structure wherein which the fibers are irregularly arrayed. In order to solder a molybdenum alloy component, such as TZM, thereto, a solder is used which is 70% silver, 27% copper and about 3% titanium.

Although such methods of joinder have proved reasonably effective for certain applications, the search has continued for improved methods of bonding dense refractory metal bodies, such as those of tungsten, molybdenum and their alloys, to carbonaceous supports by creating bonds that will exhibit excellent high temperature stability over a long term even in the face of a relatively substantial difference in coefficients of thermal expansion that would tend to create stresses at such a joint, while also resisting diffusion of carbon from such support into the dense refractory metal body. In addition, when the joinder is of an x-ray anode to a support, the thermal conductivity through the joint should preferably be adequate so that it does not create a heat flow choke that would deter heat being generated from flowing freely away from the anode, and the heat capacity of the support and its emissivity should be adequate to dissipate heat transferred to it.

SUMMARY OF THE INVENTION

The invention provides methods for joining bodies of refractory metal in elemental form to carbonaceous supports in a manner that creates a bond which is capable of withstanding temperatures at least as high as 1300° C. and preferably of at least 1500 to 1600° C. for substantial lengths of time, even higher temperatures for short periods, and perhaps more importantly of being able to withstand frequent cycling between far lower temperatures, e.g. close to room temperature, and such high temperatures. Alternative methods to certain preferred methods produce bonds which are capable of operating at a temperature of about 2000° C. or above.

In certain of these preferred methods, a Reactive metal, preferably in the form of a foil, and a powder mixture containing a boride of the refractory metal being joined, a carbide of the Reactive metal, and preferably additional elemental metal, e.g. of the foil and/or the metal body, are introduced between complementary surfaces of the bodies being joined. This assembly is then heated to a reaction-brazing temperature (as hereinafter more specifically defined). For joining dense tungsten bodies, e.g. those made of single crystal tungsten or the like, an alcohol slurry of particles of tungsten boride plus a carbide of a Reactive metal, e.g. hafnium (Hf), carbide and/or zirconium (Zr) carbide, may be applied to the carbonaceous support, which slurry may also include some of these metals in elemental form. When a Mo or Mo alloy body is being joined, Mo boride is substituted for W boride. Reactive metal in the form of a paste or preferably a foil is juxtaposed with the W or Mo surface to be joined. The slurry does preferably contain powder of the Reactive metal of the foil (and also the metal of the carbide should it be different), and it also preferably contains W or Mo powder (depending upon the body being joined). The method produces a strong joint of low thickness having good thermal conductivity that is particularly valuable in the construction of an x-ray anode. The carbonaceous substrates may, for example, be dense graphite bodies or carbon-carbon composites wherein either bundles of carbon fibers or carbon filaments from woven cloth are oriented in a direction transverse to the surface of the dense refractory body being joined, which composites may also contain fibers oriented parallel to such surface.

In a particular aspect, the invention provides a method of making an x-ray tube target anode, which method comprises providing a dense body of tungsten (W) or molybdenum (Mo) metal suitable for serving as a target anode to create x-rays, providing a carbonaceous support body capable of withstanding high temperatures under vacuum conditions and having a surface complementary to a surface of said dense body, coating said complementary surface of said support body with a layer of a material containing a mixture of particulate Hf carbide or Zr carbide and particulate tungsten boride or molybdenum boride, and joining said dense body to said carbonaceous anode support by introducing a layer of elemental hafnium (Hf) or zirconium (Zr) between said complementary surfaces of said support body and said dense body, juxtaposing said complementary surfaces of said dense body and said support, and heating to a reaction-brazing temperature under vacuum or an inert atmosphere such that said dense body thereafter strongly adheres to said carbonaceous support body. The resultant product allows good heat flow from the anode body into the support at its high temperature of operation.

In a more particular aspect, the invention provides a method of joining a dense tungsten(w) or molybdenum(Mo) body to a carbonaceous support, which method comprises providing a dense W or Mo metal body, which body has one surface designated for joinder to another body, providing a carbonaceous support body capable of withstanding high temperatures in the absence of air, which support has a surface complementary to said designated surface of said dense body, coating said complementary surface of said support body with a layer of a material comprising a mixture of particles of a refractory metal boride and of a metal carbide, providing a Reactive metal layer and juxtaposing said two complementary surfaces with said layer therebetween, and joining said dense body to said carbonaceous support body by heating to a reaction-brazing temperature such that said refractory metal body thereafter strongly adheres to said carbonaceous support while an intermediate barrier forms between said two bodies which thereafter diminishes diffusion of carbon from said support body into said refractory metal body.

In a still more particular aspect, the invention provides a method of joining a dense tungsten(w) or molybdenum(Mo) refractory metal body to a carbonaceous support, which method comprises the steps of providing a dense W or Mo refractory metal body, which body has one surface designated for joinder to another body, providing a carbonaceous support capable of withstanding high temperatures in the absence of air, which support has a surface complementary to said designated surface of said dense body, coating said complementary surface of said support with a layer of a material comprising a mixture of particles of a boride of the refractory metal of the body and of a Reactive or refractory metal carbide, juxtaposing said two complementary surfaces, and joining said refractory metal body to said carbonaceous support by heating to a reaction-brazing temperature of at least about 2200° C. such that said refractory metal body thereafter strongly adheres to said carbonaceous support and an intermediate barrier forms therebetween which diminishes diffusion of carbon from said support into said refractory metal body both during said joining step and later during use of said body in a high temperature environment.

BRIEF DESCRIPTION OF THE DRAWINGS

Shown in FIG. 1 is a method of joining a dense refractory metal body to a carbonaceous support embodying various features of the invention.

Shown in FIG. 2 is an alternative method of joining a dense refractory metal body to a carbonaceous support embodying various features of the invention.

Figure 3:
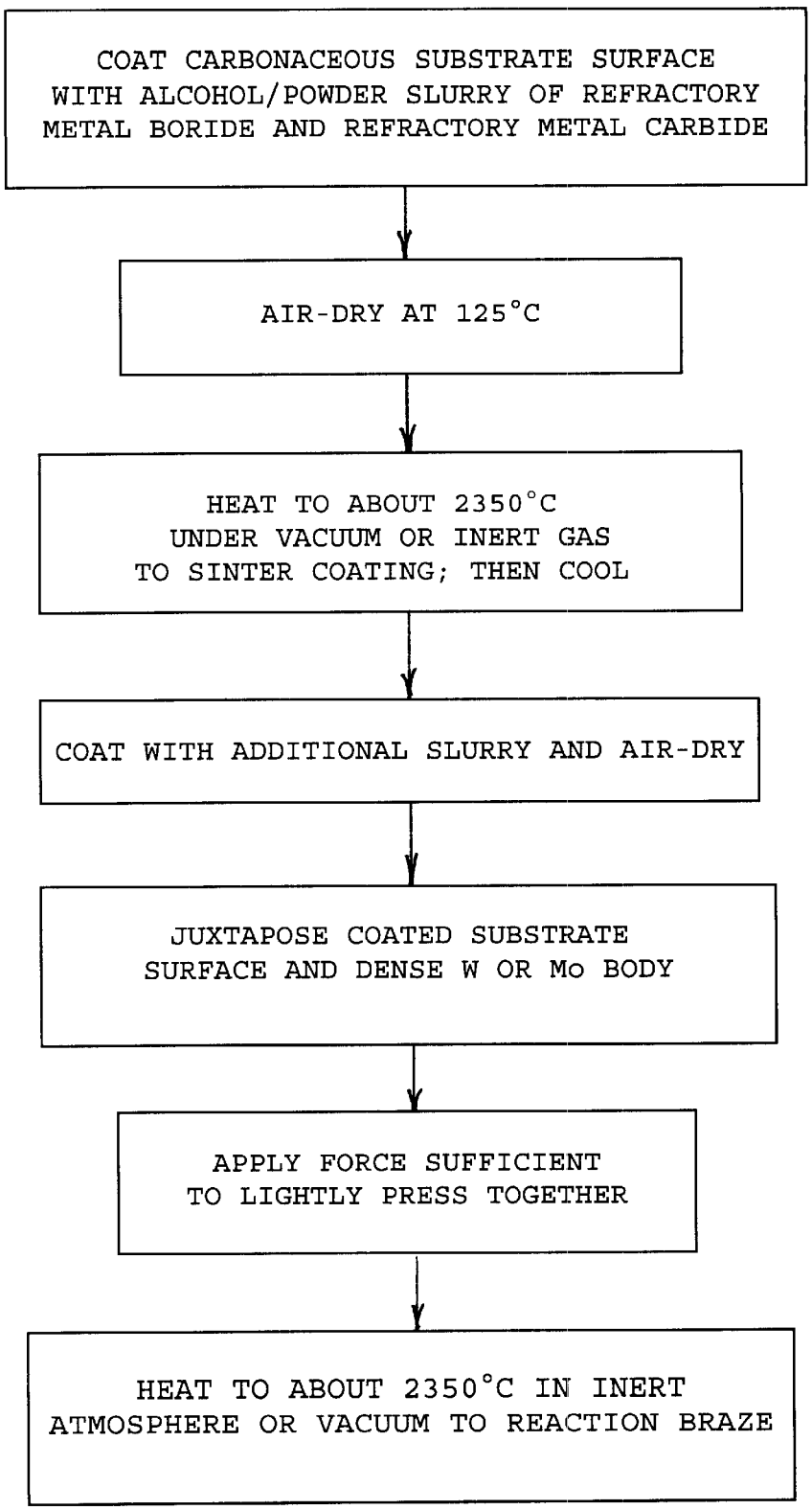

Shown in FIG. 3 is another alternative method of joining a dense refractory metal body to a carbonaceous support embodying various features of the invention.

DETAILED DESCRIPTION OF THE PREFERRED EMBODIMENTS

It has been found that the general desire to join a dense refractory metal body of tungsten or molybdenum to a carbonaceous substrate having a relatively low coefficient of thermal expansion (CTE), including carbon-carbon composites, can be very effectively achieved using reaction brazing in the presence of a refractory metal boride and a Reactive metal carbide. By "dense body of tungsten or molybdenum", for purposes of this application, is meant a body having a density at least 80% of its theoretical maximum density (preferably at least about 90% and more preferably at least about 95%), which body contains elemental tungsten, elemental molybdenum or an alloy of either that respectively comprises at least about 90% tungsten or 90% molybdenum. By Reactive metal is meant a metal having a melting point of about 1600° C. or above which forms a carbide and which forms a eutectic with either Mo or W at a temperature below its melting point and below the respective melting point of Mo or W; elements from Groups IVb and Vb of the Periodic Table are preferred, with elements of Group IVb being more preferred and Hf and Zr being most preferred.

One of the difficulties in creating a strong, stable bond between a carbonaceous substrate and a dense body of refractory metal such as tungsten or molybdenum, which bond will remain strong and stable for substantial periods of time at high temperatures, i.e. at least about 1300° C. and preferably at least about 1600° C., and conceivably of about 2000° C. is the accommodation of the stresses that necessarily result from the substantial differences in the linear CTEs. It is important to be able to produce a bond having a structure that will withstand the strains and stresses which necessarily will occur during substantial temperature excursions between ambient and operating temperatures because of the CTE differences. For example, at room temperature, the CTE of tungsten is about $4.5 \times 10^{-6}/°$ C., and the CTE of molybdenum is about $5.43 \times 10^{-6}/°$ C., and when there is a substantial difference between the CTE of the dense refractory metal body and that of a carbonaceous substrate (e.g. a fibrous composite substrate may have a CTE of about $1 \times 10^{-6}/°$ C. in the direction of orientation of the fibers whereas dense graphite substrates can vary from about $3-9 \times 10^{-6}/°$ C.), there is the distinct possibility of developing high strains at and near the interface of the bond during temperature excursions. Of course, such excursions are to be expected because high temperature operation for such structures is generally anticipated, as for example when the structure will serve as a rotating x-ray anode, because present x-ray tube anodes reach such high temperatures that their operation must be frequently interrupted to allow them to cool.

Various carbonaceous supports are contemplated including graphite, pyrolytic graphite, fiber-reinforced pyrolytic graphite and carbon-carbon composites. Carbon-carbon composites, wherein carbon fibers are embedded in a carbon matrix, have become widely available in recent years and can be created with very good structural properties; accordingly, they have become one preferred material for use in high temperature structural applications, including use as a support base for a rotating x-ray anode. Such a carbon-carbon composite will generally have a density of at least about 1.7 g/cm$^3$ and an emissivity in the range of about 0.85 to 0.99 so as to allow for adequate dissipation of heat. Such composites may be fashioned from lay-ups having various orientations of carbon fiber arrays or graphite fiber cloths, and often they are fashioned from woven carbon fiber fabric or from bundles or tows of carbon fiber filaments that are suitably aligned in generally parallel fashion in alternating layers, although carbon-carbon composites having a three-dimensional carbon frameworks may also be used and may be preferred. When such a carbon-carbon composite is used for the base material to support a dense refractory metal body, the orientation is preferably such that the alignment of some of the bundles of fiber or of the woven sheets is transverse to, preferably perpendicular to, the juxtaposed surface of the refractory metal body being joined. The carbon fibers or filaments that are present in such composites have higher tensile strength in the axial direction, and because they are preferably aligned transverse to the surface of joinder, the joint will be stronger. Of course, when there is a three-dimensional carbon fiber framework, there will always be some carbon fibers that will be oriented transverse to any surface.

Traditional carbonaceous supports for x-ray tube anodes utilize graphite having a density of at least about 75% of theoretical density. Graphite has a number of different crystalline forms, and the preferred graphite forms for use as a rotating anode support are those having a relatively high CTE approaching that of the metallic body. Although isotrophy is not considered to be a criterion of major importance, preferred graphites are those that would be categorized as being isotropic, as opposed to anisotropic. Such graphites are readily commercially available, as from Toyo Tanso and the Poco Graphite Co. One preferred graphite is Toyo Tanso grade IG-610U.

While many early attempts at creating joints, as evidenced by some of the patents mentioned hereinbefore, utilized layers of tungsten or the like that had been deposited from a vaporous atmosphere, as by CVD, to serve as a focal path for a rotating anode for x-ray generation, it is believed that the durability of such an arrangement may be inherently limited as a result of the stresses mentioned hereinbefore, i.e. that would be created as a result of the difference in the CTEs, thus limiting the useful lifetime of such a structure. Another limitation on useful lifetime results from the effect that extremely high temperature at the joint would have on the thin metal and the adjacent carbon body. It has since been found that, by using a pre-prepared dense body of tungsten, e.g single-crystal tungsten, or of molybdenum, to support a tungsten focal track, structures having high temperature stability and durability can be created. Although elemental tungsten or elemental molybdenum may be used, an alloy of either TZM (99% Mo, 0.5% Ti, 0.07% Zr and 0.05% C, by weight) or TZC (having a somewhat greater amount of carbon) is often used, rather than Mo, because such has greater strength and is readily commercially available. Likewise, alloys of W, e.g. with a small amount of Re, might also be used. However, for a rotating x-ray anode, single crystal material, rather than polycrystalline material, may be preferred.

In addition to creating a strong bond that will resist the strains expected to be experienced during high temperature excursions, it has also been found worthwhile that the joint should provide a thin but effective barrier to carbon diffusion therethrough from the support to the anode body. It is felt that a joint should preferably be constructed to retard the diffusion or migration of carbon from the support body; otherwise, a carbide zone may be formed not only within the region of the initial joint itself, but throughout an expanded region intruding into the surface regions of the anode. Such diffusion-resistance may be particularly of value in the field of x-ray anodes where longevity and continued high thermal conductivity during operation in a high temperature environment are important, because the thermal conductivity of such a metal carbide is substantially lower than that of the bodies being joined. Moreover, a fairly thick carbide zone is more prone to develop cracks as a result of thermal cycling because of inherent differences in CTEs.

It is found that such an effective barrier to the creation of a relatively thick layer of metal carbide can be achieved as a part of a strong joint by coating the surface of the carbonaceous substrate, where joinder will take place, with a mixture that contains a particulate boride of the refractory metal body to be joined and a particulate Reactive metal carbide, preferably Hf carbide or Zr carbide. For example, if the intention is to join a dense body of tungsten to the carbonaceous support, an initial precursor layer in the form of a mixture of particulate tungsten boride and hafnium carbide may be applied to the appropriate surface of the composite. Such application may take place in any suitable fashion, and thereafter reaction brazing results in the creation of a relatively thin, strong joint of good overall thermal conductivity. When a Mo dense body is to be joined to a carbonaceous support, a particulate mixture of either Hf carbide or Zr carbide and Mo boride may be used which preferably comprises a major portion of the metal carbide and a minor portion of the metal boride. If for example instead a dense tungsten body is to be attached to a carbonaceous support, tungsten powder in combination with either hafnium or zirconium powder would preferably be used as a minor part of the particulate mixture being employed in the reaction brazing.

The particles in such mixtures may range in size up to about 50 $\mu$m; however, preferably particles having an average size in the range of about 5 $\mu$m to about 25 $\mu$m and more preferably particles with an average size between about 5 $\mu$m and about 15 $\mu$m are used. Often the metal carbide will be present in an amount at least about 2–3 times the weight of the metal boride and more preferably about 2.5 to 3.5 times the weight of the metal boride. Such mixtures of particulate metal carbide and particulate refractory metal boride can be slurried with an alcohol and with a binder, such as a cellulose derivative, to create an adherent, paste-like material that can be conveniently first brushed as a viscous fluid onto the surface in question.

The mixture being coated onto the carbonaceous substrate preferably also includes minor amounts of the elemental metals that are present in the carbide and boride constituents; for example, molybdenum or tungsten powder and hafnium or zirconium powder may be present, e.g. in individual amounts equal to about 10 to 20 weight % of the total particulate mixture. The particle size of the elemental metals can be about the same as set forth above, or they may be slightly smaller. As a general rule, such elemental metal powders are each preferably employed in an amount about equal to or within about 25% of the weight of the boride. Moreover, the amount of Mo or W powder should be approximately equal to the amount of Hf or Zr. Overall, Mo or W powder is preferably not employed at a weight percentage that is more than about 20% greater or less than that for the Hf or Zr, and preferably there is not more than about a 10% difference in the weight percents. They are most preferably employed in about equal amounts.

Overall, the particulate mixture preferably consists essentially of between about 14% and about 20% by weight of the refractory metal boride, between about 45% and 56% by weight of the Reactive metal carbide, and between about 13% and about 19% each of Hf and Mo powders. More preferably, the mixture contains between about 15% and about 19% of MoB or WB and between about 46% and about 55% of hafnium or zirconium carbide, with the remainder preferably being essentially equal amounts of elemental hafnium and molybdenum.

Figure 1:
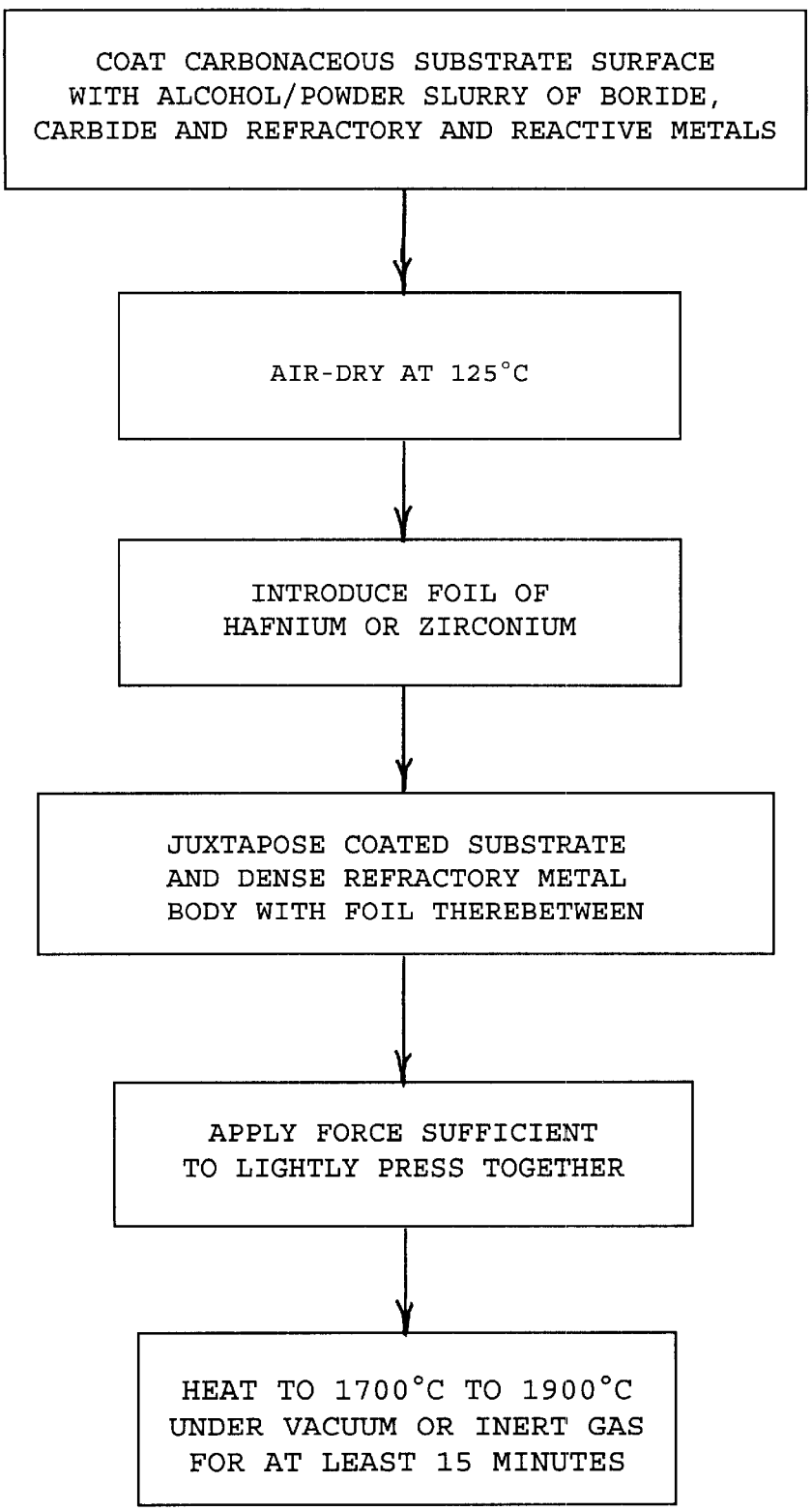
Figure 2:
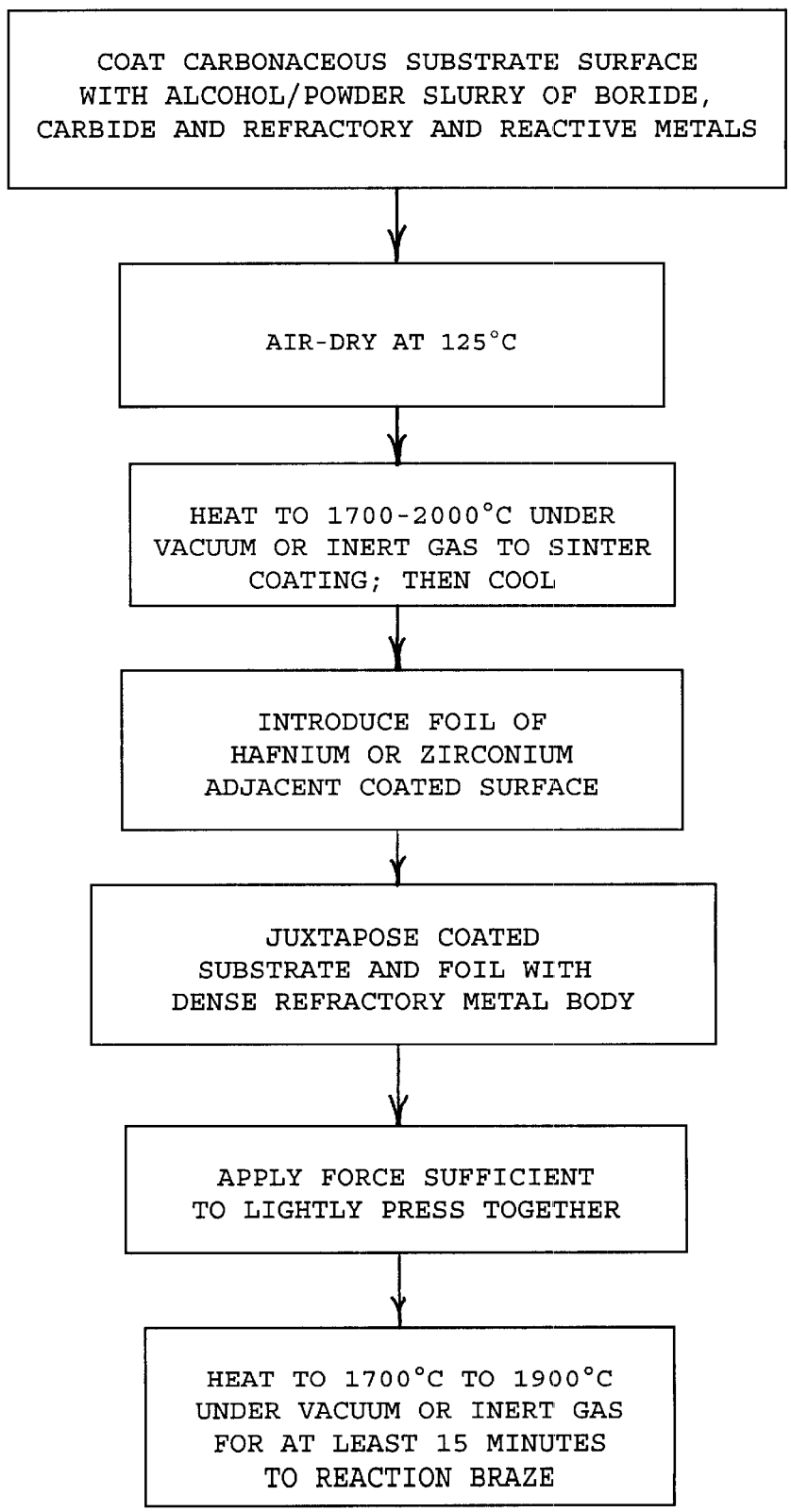

Once the surface has been coated with such a slurry, it may be heated to a temperature sufficient to sinter the boride and carbide particles, as depicted in FIG. 2, under vacuum conditions or in an inert atmosphere which is essentially devoid of $O_2$, $N_2$, $H_2$, CO, $CO_2$ and $SO_x$, (except for trace amounts such as might be present in high purity commercial gases), all of which are considered to be potentially deleterious to achieving strong bond having long-term stability. The time and temperature of the reaction-sintering step is adjusted as well known to those having skill in this art, depending upon the particular compounds that are present. For example, if the slurried layer includes molybdenum boride and hafnium carbide, a reaction-sintering step might be carried out at a temperature of about 1850 to about 1950° C. for about 20 to 30 minutes, after raising the coated substrate reasonably slowly to this temperature. As a result, there is an interdiffusion of metals and a reaction between the carbonaceous substrate and one or more of the metals and the boride-containing material in the slurry. Only partial melting occurs, and this phase wets and interacts with the carbon surface and create a very thin, adherent layer of hafnium and molybdenum carbide; this layer effectively diminishes the diffusion of carbon into the remainder of the braze region during the subsequent reaction-brazing step and during subsequent use. Although such pre-sintering is effective, it may be unnecessary as alternatively it has been found that such joinder of a dense refractory metal body to a carbonaceous support may be effectively carried out using a single heating step (FIG. 1) as described hereinafter following a brief description of this two-step process, depicted in FIG. 2.

Although use of a boride of the same refractory metal as the dense body that is to be joined is preferred, there are other options. For example, when a Mo body is being joined, one or more other compatible refractory or Reactive metal borides, such as tungsten boride, vanadium boride and/or zirconium boride, may be used either together with, or to the exclusion of, Mo boride. The tungsten boride may be WB, $W_2B$ or $W_2B_5$; however, preferably $W_2B$ is used, particularly when a W body is being bonded. Similarly, the molybdenum boride may be $MoB_2$, MoB, $Mo_3B_4$ or $Mo_3B_5$; preferably, however, MoB is used. A relatively thin, but continuous layer of such particulate material slurry is preferably applied so that the final thickness of the joint is about 0.007 in (0.18 mm) or less, preferably not greater than about 0.005 in (0.13 mm) and more preferably about 0.003 in (0.08 mm) plus or minus 0.001 in (0.03 mm).

Although hafnium carbide is the more preferred carbide, instead of using hafnium carbide particles in this sintering mixture, zirconium carbide might be substituted for part or all of the Hf carbide. Alternatively, either might be used together with particles of molybdenum carbide, vanadium carbide, or tungsten carbide in the slurry for coating the carbonaceous surface.

The second step of the preferred, somewhat lower temperature joining method introduces a layer of Hf or Zr between the surface of the dense refractory metal body and the reaction-sintered surface of the carbonaceous support; thereafter, reaction-brazing is carried out. The layer can be one of a dense paste of metal particles or metallic foil. Metal foil is preferably used, and it may be in the form of sheet material about 1–3 mils (0.001–0.003 in) in thickness. It is placed adjacent the surface of the dense refractory metal body to be joined and can be a single sheet or multiple sheets, depending in part on what is commercially available. For example, two sheets of 1 mil (0.001 in, 0.0254 mm) thick hafnium foil may be used to provide a layer 2 mils in thickness.

When the single-step method (FIG. 1) is used, the foil layer is simply located atop the air-dried slurry-coated carbonaceous substrate. The introduction of a continuous layer of a paste mode of small Reactive metal particles is feasible but much less desirable. Then the dense refractory metal body is juxtaposed, and the reaction-sintering step is carried out. Regardless of whether the one-step or the two-step method is used, the composition of the reaction braze material will be essentially the same. As previously mentioned, the material should include a mixture of a refractory metal boride and a Reactive metal carbide, preferably with additional compatible elementary Reactive and refractory metals, e.g. Hf and Mo powder. As earlier mentioned, the braze material is applied as a mixture of a binder and such particulate materials, preferably as an alcohol slurry of a binder and the particulate/powder mixture, using a suitable alcohol, such as ethyl alcohol. A cellulose derivative or a comparable organic binder, that will be removed by dissociation and volatilization during the subsequent heating to the reaction-sintering temperature, is preferably used to create a fluid mixture having the consistency of a flowable paste that can be uniformly brushed or otherwise suitably applied onto the carbonaceous surface.

Once the braze material coating has been applied, it is heated in air to cure the binder. For example, heating to 125° C. for about 12 hours will partially polymerize a cellulose binder and vaporize the alcohol. Clean foil which is free of contaminants is then placed to cover the overall coated surface of the substrate, and the dense refractory metal body is lightly pressed thereatop, sandwiching the foil therebetween to prepare the assembly for the thermal braze cycle. Either gravity or preferably a small weight placed atop the dense refractory body is relied upon during the reaction-brazing cycle to maintain the surfaces in juxtaposition with each other. For example, it may be desirable to have a pressure of about 0.2 to 0.8 psi on the foil. The thermal cycle which is used will generally include staged heating as described hereinafter to a temperature at or near that of the desired reaction-brazing temperature. The staged heating up to the reaction-brazing temperature will usually take place over at least 1 hour and preferably over about 2 hours or more. The reaction-brazing temperature should then be held for a period of at least 10 minutes, more preferably at least about 15 minutes, and most preferably over at least about 20 minutes. This arrangement assures that the surface of the metal body alloys with the thin foil, the alloy (eutectic phase) of which also participates with the boride and carbon that may be present to form additional carbides en route to forming a strong, stable reaction-brazed joint, which includes a thin barrier layer of refractory metal carbide and eutectoid phases which collectively diminish diffusion of carbon from the carbonaceous substrate into the upper region of the joint and the dense refractory metal body during future high temperature operation. Moreover, it is believed that the presence of the elemental Hf and/or Zr and the elemental Mo or W are helpful in creating an eutectoid (i.e. solid state) reaction wherein there will be such a metallic alloy zone on the Mo body (or W body) side of the carbide layer. For example, it may be a solid solution of Hf and HfMo$_2$ that, at and above the eutectic temperature, forms a liquid solution of about 28 weight % Mo and about 72 weight % Hf which dissolves some MoB and carbon; however, there is a reversal during cooling below 1865° C. where an Hf-rich solid solution and the compound HfMo$_2$ form from the liquid phase. Then, after cooling to about 1230° C., a eutectoid (i.e., solid state) reaction occurs wherein the Hf-rich solid solution phase decomposes to a Hf phase of low Mo solubility plus additional of the compound HfMo$_2$; i.e. Hf($\beta$)←Hf($\alpha$)+HfMo$_2$. It is felt important that the resultant joint be able to accommodate such thermal cycling, to which an X-ray target anode and other such devices will be subjected, where the temperature exceeds the eutectoid temperature (1230° C.) so that this repeated eutectoid reaction will be experienced within the joint.

One example of the preparation of a carbon-carbon composite suitable for joinder as a support for an x-ray anode employs commercially available carbonaceous material which is at least about ½ inch in thickness and which has Z-axis fiber bundles that are oriented substantially perpendicular to the surface at which bonding is to be achieved. The composite is cleaned in ethanol using ultrasonic cleaning and then baked under vacuum conditions at about 1000° C. for an hour, followed by baking at a temperature of about 2600° C. for about 10 to 15 minutes, to remove any volatiles that might otherwise potentially have an adverse effect upon the integrity of the joint. One preferred alternative material is dense graphite such as that available from the Toyo Tanso Co. of Japan as their grade:IG-610U. Generally, the graphite is preferably isotropic and should have a density of at least about 75% of its theoretical density of 2.26 gm/cm$^3$, e.g. about 77 to 80%; it should have a coefficient of thermal expansion of at least about $5 \times 10^{-6}$/° C., but preferably not greater than about $6 \times 10^{-6}$/° C. Such graphite should also have a thermal conductivity of at least about 100 W/m° C.

As previously indicated, the preferred brazing material is a slurry of a mixture of particulates together with an organic binder in a suitable organic solvent, e.g. ethyl alcohol. The binder may be a cellulose compound, such as hydroxypropylcellulose, or any other commercially available organic binder that will be removed as a result of heating under vacuum conditions or leave no more than a minute carbon residue. The metal carbide particles and the refractory metal boride particles may be of about the same size range. Generally, the particle sizes between about 50 $\mu$m and about 5 $\mu$m may be used, and particles which pass through a 325 mesh (45 $\mu$m) screen may be used, but particles between about 5 $\mu$m and about 15 $\mu$m are generally preferred. Although elemental Reactive and refractory metals may also be used in the same particle size range, these materials are commercially available in powder form; thus, molybdenum and/or tungsten and hafnium and/or zirconium are conveniently supplied as powders in a size between about 20 $\mu$m and about 5 $\mu$m. The slurry layer is preferably applied in a thickness so as to result in a joint which is about 2 mils (about 50 $\mu$m) thick without the contribution of the foil.

The reaction-brazing temperature will vary somewhat depending upon the materials that are being used, but the assembly will generally be held at such temperature for at least about 15 minutes. Very generally, a temperature well below the melting point of the dense refractory metal, i.e. molybdenum or tungsten, is chosen so that melting of such clearly does not occur. However, the temperature should be sufficiently high so that a eutectic is formed between the foil, a minor amount of the metal powder and the Mo or W material at the surface being bonded; this eutectic takes part in creating a strong bond at this surface during the reaction-brazing step. For example, molybdenum is considered to have a melting point of about 2890° K. (2617° C.), and whereas alloys of Mo with hafnium (M.P. of 2503° K., 2230° C.) have a measured eutectic point at about 1930° C., it appears to be depressed to about 1865° C. as a result of the presence of carbon and the boride phase. Thus, it is found that operation can be carried out at a temperature slightly below the measured eutectic point for a system using the two metals, i.e. molybdenum and hafnium, and will produce a very effective braze as part of this overall novel joining method. Accordingly, in such a system, a reaction-brazing temperature between about 1835° C. and 1895° C. is preferred, with a temperature between about 1850° C. and about 1880° C. being more preferred and a brazing temperature of about 1865° C. being most preferred. Alternatively, when zirconium carbide and zirconium powder are included in the slurry instead of hafnium carbide and hafnium powder, the measured eutectic temperature of Zr (M.P. of 2125° K., 1852° C.) and Mo is lower, i.e. about 1520° C.; accordingly, such a reaction-brazing might be carried out at a temperature below 1500° C., e.g. about 1460° C., or at a higher temperature if desired. When tungsten or an alloy thereof is used as the dense refractory material, although it has a much higher melting point, i.e. about 3680° K. (3407° C.), it also forms a eutectic with hafnium at close to the eutectic temperature of Mo and Hf, i.e. about 1930° C. Accordingly, brazing temperature ranges below 1900° C., as generally mentioned above, should also be appropriate for W/Hf. Moreover, pure tungsten and zirconium form a eutectic at a temperature of about 1660° C., so temperatures about 20 to 30° C. below this may be suitable for reaction-brazing using a comparable mixture containing W and Zr. However, somewhat higher brazing temperatures, e.g. up to the measured eutectic temperature of the refractory metal of the body and the Reactive metal in the slurry, may generally be used without detriment. In fact, if even higher operational temperatures should be desired, a higher temperature operational joint may be produced, as described hereinafter, by reaction-brazing W to C using a particulate mixture of WB and HfC or WC that is devoid of significant amounts of elemental metals so that the eutectic does not include contribution from an elemental Reactive metal.

The amount of alcohol and/or organic binder in the mixture is not particularly critical so long as potential separation of the various particle fractions is prevented, i.e. to prevent partitioning as a result of different weights or densities. It is generally satisfactory that a sufficient amount of binder is used so as to provide integrity in the coated layer, i.e. so that it will remain in place on the surface and there will be uniformity of particle distribution throughout. The thickness of the coated layer will usually be between about 0.5 mil and about 3 mils (0.076 mm) and preferably between about 1 mil and 2 mils (0.051 mm). Once the surface of the substrate has been coated to provide a layer of the appropriate depth, the binder is cured by heating in air for about 12 hours while the alcohol is volatized. The foil sheet or sheets are then positioned thereatop and sandwiched between this coated surface and the dense refractory metal body being joined. A weight is preferably added to the assembly so that gravity will create a light pressure during the reaction-brazing step. Generally, the amount of weight should be equal to the weight of the dense refractory metal body plus or minus about 50%; in one experiment, weight was added to create a normal pressure stress of 0.4 lb/in$^2$ (0.00276 MPa) which proved adequate.

As previously mentioned, the heating (and preferably the cool-down) preferably take place in stages to bring the assembly from ambient or room temperature up to the reaction-brazing temperature, where it will be held for a period of at least about 15 minutes and then returned it to ambient. Such stages may be varied with some amount of latitude; for example, the temperature may be raised at a substantially linear rate from ambient to about 700° C. over a time of about 60 to 90 minutes, although a shorter period may be used. Thereafter, the temperature is preferably raised to the desired reaction-brazing temperature in two or three increments, with brief soakings preferably being used at such intermediate incremental temperatures to assure that temperature gradients within the assembly are minimized. Likewise, upon the initial stage of cooling, a slower rate is preferred to enable any liquid phase to solidify uniformly in place within the assembly, thereby preventing radial flow and the potential creation of voids in the joint.

The following examples describe methods presently preferred for the reaction-brazing of such materials and constitute the best mode known by the inventors for carrying out the invention. However, they should be understood to be merely exemplary and not to constitute limitations upon the scope of the invention which is set forth in the claims that are appended hereto.

EXAMPLE I

Preparations are made to join a graphite ring machined to have an outer diameter of about 5.35 inches (13.59 cm) and an inner diameter of about 2 inches (5.08 cm) to a disk of TZM (molybdenum alloy) of about the same outer diameter (about 5.25 in) which has a central hole of 0.5 inches (1.3 cm) and a thickness of 0.416 inch (1.06 cm) at its greatest thickness. The TZM disk has a flat lower surface and a beveled top surface so that its thickness is greater in the center at the region of the half-inch hole. The graphite ring is machined from IG610U near-isotropic, medium grain, fine porosity graphite having a CTE of about $6 \times 10^{-6}/°$ C., which is relatively close to the CTE of molybdenum, i.e. $5.43 \times 10^{-6}/°$ C. The graphite ring has a thickness of about 2 inches at its center and a bevel toward its outer circumference.

The planar face of the graphite ring was ground using abrasive paper having a silicon carbide grit of Mesh Size No. 240 and then cleaned using ultrasonic cleaning in ethanol. After pumping the cleaned part free of alcohol under vacuum, it was subjected to a high temperature bake-out along with a similarly cleaned ¾ inch diameter graphite sample that was to be used as a process control and microstructure analysis specimen. Heating of the graphite parts was carried out for about 30 minutes at 1920° C. under a vacuum of about $10^{-4}$ Torr. This bake-out releases and disperses any volatiles that might otherwise be released during the subsequent reaction-sintering and potentially form undesirable porosity in the liquid phase of the reaction-braze material. A brazing slurry is then formed from a particulate/powder mixture in alcohol, i.e. ethanol, using a solution of 99 parts ethanol and 1 part hydroxypropylcellulose, which was stirred to obtain a solution of transparent clarity and stored so as to prevent absorption of water from the atmosphere. All of the powders used had greater than 99.5% purity. All were of less than 325 mesh size (about 45 μm), and most of them had an average particle size of about 10 μm, being generally between about 5 μm and about 20 μm. The powder mixture was formulated using four different powders in the following weight percents: Hf—16%, Mo—16%, MoB—17% and HfC—51%.

Each powder was individually added to the solution and mixed to achieve 10 parts of this powder mixture in 6 parts by weight of the cellulose alcohol solution; it was then stirred slowly by hand with a Teflon stir rod for about 20 minutes to thoroughly mix it and obtain a uniform gray-colored slurry of viscous but pourable and paintable consistency.

The top surfaces of the graphite ring and the ¾ inch diameter graphite cylinder were then coated with the powder slurry. The graphite ring weighed about 886 grams, and about 4 grams of the powder slurry were applied uniformly across the flat face of the graphite ring that had an area of about 19.33 in , i.e. about 1 gram of powder slurry per 5 sq. in. Painting was carried out by hand using an artist-quality bristle paint brush. The slurry was applied in layers and allowed to air dry. The graphite ring and the test cylinder were periodically weighed until the desired amount of the powder mixture had been applied to both.

Once these levels were achieved, the graphite parts, with the powder slurry-coated faces positioned upwards and horizontal, were heated in a convection oven at about 125° C. allowing the cellulose binder to cure in air over 9 to 10 hours, during which time ethanol and any water that might be present evaporated. The parts were then removed, allowed to cool and then associated with hafnium foil.

Two rings of hafnium foil, each about 0.001 in. (0.025 mm) thick, were used; each had an O.D. just slightly less than the O.D. of the graphite ring and slightly greater than the O.D. of the TZM ring, which is about 5.25 in.(13.34 cm) and an I.D. slightly smaller than the I.D. of the graphite rim. Assemblies are then created with the hafnium foil disposed horizontally upon the slurry-coated flat surfaces of the graphite support and with the TZM ring resting upon the Hf foil. A similar TZM disk having a flat lower surface is used to overlie two circular disks of Hf foil on the test cylinder. Three metal weights of tungsten and tantalum were then positioned atop the TZM disk to bring the total weight bearing upon the hafnium foil disks to about 2836 grams, which corresponds to a downward pressure of about 0.4 psi over the surface area of about 19.33 square inches. The test sample was similarly weighted.

The two assemblies were then transferred to a vacuum furnace having tungsten heating elements disposed within a water-cooled exterior boundary, which was then evacuated to about $9 \times 10^{-6}$ Torr. Heating was carried out at a rate of about 600° C. per hour until a temperature of about 700° C. was reached, at which time the temperature was held for about 5–15 minutes (soaking). The rate of heating was then increased to about 1,000° C. per hour, which rate was thereafter used. Once the target temperature of 1200° C. was reached, it was held for 5–10 minutes, and after 1600° C. was reached, it was held for about 10–20 minutes. Heating was then continued to about 1865° C., the desired reaction-brazing temperature, and the assembly was held at this temperature for 20–30 minutes at a furnace pressure of about $1 \times 10^{-4}$ Torr. As the temperature rises, the Hf foil becomes joined to the Mo alloy body by solid-state diffusion reaction and by the eutectic reaction, i.e. solid Hf (alloyed with Mo) phase+$HfMo_2$ phase forms liquid eutectic phase at eutectic temperatures. Following completion of the reaction-brazing step, the assemblies were slowly cooled at a rate of about 200° C. per hour for the first 100° and held at about 1765° for about 10 minutes. Cooling at the same rate to 1600° was then effected, and this temperature was held for about 1 minute. The rate of cooling was then increased to about 1000° C. per hour until about 600° C., where the rate gradually slowed as radiative cooling efficiency begins to diminish. After ambient temperature was reached, e.g. below about 40° C., the furnace vacuum was ended, and pressure was returned to atmospheric.

Visual examination of the parts shows that brazing is uniform about the entire periphery and that the Hf foil has formed a smooth substantially continuous fillet at the outer surface of the juncture. Both assemblies were examined under a stereomicroscope at magnifications between 3× and 10×, and no evidence of any microcracks was detected. Examination was then carried out using x-ray radiography, and the results were negative indicating that there appeared to be no substantial defects present in the joint region of either assembly. The smaller assembly was then mounted in epoxy and cross-sectioned across a diameter of the cylinder. It was then remounted in epoxy which was cured to create a metallographic mount. Using standard metallographic grinding and polishing techniques, the cross-section was prepared and then examined in a scanning electron microscope to observe the microstructure in the joint region and check for any voids or large pores, cracks or other nonuniformities; none were found. Measurements of the joint thickness were made, and the thickness was found to be between about 0.0025 and about 0.003 inch (0.064 and 0.076 mm).

Based upon these observations, it is concluded that this reaction-brazing has resulted in the creation of a molybdenum disk supported upon a dense graphite substrate that will be excellently suited for use as a rotating anode in commercial x-ray tubes because a strong, defect-free bond has been achieved as a result of this reaction-brazing process.

EXAMPLE II

A procedure as generally set forth in Example I is carried out using a 2-inch diameter graphite ring and a TZM disk of comparable size. Following application of the slurry to the flat surfaces of the graphite ring substrate and a test cylinder, they are reaction-sintered in accordance with the two-step process depicted in FIG. 2. The coated graphite supports are placed in the vacuum furnace under the same vacuum conditions and heated to a temperature of about 1945° C. over a time period of about 2 hours and 30 minutes using a very similar heating schedule to that previously described. Once this reaction-sintering temperature is reached, the coated supports are held at this temperature for about 30 minutes. Thereafter, heating is discontinued, and the furnace is cooled to ambient temperature using a schedule essentially the same as in Example I.

Thereafter, the two rings of hafnium foil are inserted atop the sintered layer, and a TZM disk is placed thereatop and weighted generally as described in Example I. The test cylinder is separately assembled as before. The assemblies are then returned to the vacuum furnace, and reaction-brazing is carried out using the time and temperature schedule set forth in Example I heating to a temperature of about 1865° C. Following cooling down under similar conditions to Example I, the assemblies are removed, and examination and cross-sectioning of the test cylinder show that a strong, uniform joinder of the bodies has been achieved.

In order to test the longevity and other characteristics of the reaction brazes that are being obtained, the Example II sample and a comparable 2-inch diameter sample fabricated according to the process of Example I are soaked for about 50 hours at about 1600° C. in the vacuum furnace under a vacuum of about $10^{-4}$ Torr. Following such soaking at 1600° C., the samples are caused to cycle between 1600° C. and 750° C., being repeatedly allowed to drop over about 50 minutes to 750° C. before raising the temperature back to 160° C. over the next 50 minutes. This process is repeated 20 times so that the samples have each been subjected to 21 thermal cycles. Each time, the samples are held at the 1600° C. level for about 10 minutes and are similarly held at the 750° C. level for about 10 minutes; this constitutes a severe test cycle designed to test the suitability of the product to withstand the cycling that a rotating anode would be expected to experience.

Following the 1600° soak and the 21 cycles as described, the joined bodies are examined by X-ray radiography and otherwise, and the bonds appear to be continuous and strong. When the samples are cross-sectioned transverse to the joint and subjected to metallographic examination, it is seen that the thickness of the joint has not grown and that there are only minor amounts of molybdenum carbide and molybdenum boride phases in the grain boundaries of the TZM body adjacent to the joint microstructure of the assemblies made using the one-step method of Example I. A very thin continuous layer of hafnium-rich carbide (equal to about 20% of the thickness of the joint) extends throughout the entire circular area and has remained substantially the same thickness as when it was formed by reaction-brazing. This continuous carbide layer and the balance of the joint microstructure of carbide and boride discrete phases, in conjunction with the Hf plus HfMo$_2$ eutectoid phase form a very effective barrier to carbon migration from the graphite substrate into the dense molybdenum alloy (TZM) body. The foregoing is confirmed by microhardness readings.

Examination of the Example II sample shows a quite similar joint microstructure; however, there is included a thin zone of molybdenum carbide/boride phase that is formed generally adjacent the eutectoid rich zone of the joint that appears to have resulted from C and B diffusion during the high temperature test exposure following the initial reaction-sintering step. However, because the joint thickness has remained about the same and prevented growth of a thick carbide zone into the TZM alloy body, the sample retains good thermal conductivity across the bond (as does the sample from the method of Example I) which is an important feature for a rotating x-ray anode.

Both methods produce quite acceptable resultant products and are considered to be very well-suited for manufacturing rotating x-ray anodes that can be used for a substantial length of time at temperatures in the range of 1500–1600° C. without suffering deleterious consequences. The somewhat simpler one-step process is considered to be presently preferred because of the economics of its practice; moreover microscopy examination shows that there is a lesser indication of carbon and/or boron diffusion, i.e. there is detection of a lesser, minor presence of carbide-boride phases, which are only in the grain boundaries of the adjoining Mo alloy body, and only a minimal increase in microhardness.

EXAMPLE III

A procedure as generally set forth in Example I is carried out using a 2-inch diameter carbon-carbon composite ring and a single crystal W disk of comparable size. A brazing slurry is formed from a particulate/powder mixture in alcohol, i.e. ethanol, using a solution of 99 parts ethanol and 1 part hydroxypropylcellulose. The powder mixture is formulated using equal weight percents of tungsten boride and tungsten carbide and is mixed to achieve 10 parts of this powder mixture in 6 parts by weight of the cellulose alcohol solution.

The top surfaces of the carbon-carbon ring and the test cylinder are coated with the powder slurry by painting by hand using an artist-quality bristle paint brush. The slurry is applied in layers and allowed to air dry. The ring and the test cylinder are periodically weighed until the desired amount of the powder mixture has been applied to both.

Once these levels are achieved, the carbon-carbon parts, with the slurry-coated faces positioned upwards and horizontal, are heated in a convection oven at about 125° C. allowing the cellulose binder to cure in air over 9 to 10 hours, during which time ethanol and any water that might be present evaporate. The parts are then removed, allowed to cool and then reaction-sintered as generally depicted in FIG. 3. The coated carbon-carbon supports are placed in a high temperature furnace under the same vacuum conditions; the furnace is back-filled with argon and heated to a temperature of about 2350° C. over a time period of about 1 hour using a heating schedule similar but more rapid than that previously described. Once this reaction-sintering temperature is reached, the coated supports are held at this temperature for about 7 minutes. Thereafter, heating is discontinued, and the furnace is cooled to ambient temperature using a schedule essentially the same as in Example I.

Thereafter, each sintered layer is coated with a second layer of the same slurry material, which may optionally include up to about 5% of carbon powder, and then similarly air-dried. A single-crystal W disk is placed thereatop and weighted generally as described in Example I. The test cylinder is separately assembled as before with a similar W disk. The assemblies are then returned to the vacuum furnace, and reaction-brazing is carried out in vacuum, or optionally in inert gas, using a time and temperature schedule generally as set forth in Example I but heating to a final temperature of about 2350° C. and holding that temperature for about 10 to 15 minutes. Following cooling down under a similar schedule as that in Example I, the assemblies are removed, and examination and cross-sectioning of the test cylinder show that a strong, uniform joinder of the bodies is achieved and that the single crystal W disc will be excellently suited for use as a rotating anode in commercial x-ray tubes because its character will allow its operation at a temperature as high as about 85% of the reaction-brazing temperature, e.g. about 2000° C.

Although the invention has been described with regard to certain preferred embodiments, it should be understood that various modifications and changes as would be obvious to one having the ordinary skill in this art may be made without departing from the invention which is set forth in the claims which are appended hereto. For example, other dense graphite such as dense pyrolytic graphite may be used; by "dense" is generally meant having at least about 75% of theoretical maximum density, with at least about 90% being preferred. Likewise, carbon fiber-carbon matrix composites having a density of at least about 1.7 gm/cm$^2$ may also be employed. Other solvents and binders as well known in this art may be employed as they do not take part in the final brazing step. The disclosures of all U.S. patents mentioned hereinbefore are expressly incorporated by reference. By major amount is meant at least about 40 weight %, and by minor amount is meant not more than about 25 weight %. By a temperature of about a certain number of degrees is meant plus or minus 20 degrees.

Particular features of the invention are emphasized in the claims that follow.

What is claimed is:

1. A method of making an x-ray tube target anode, which method comprises
   providing a dense body of tungsten (W) or molybdenum (Mo) metal suitable for serving as a target anode to create x-rays,
   providing a carbonaceous support body capable of withstanding high temperatures under vacuum conditions and having a surface complementary to a surface of said dense body,
   coating said complementary surface of said support body with a layer of a material containing a mixture of particulate Hf carbide or Zr carbide and particulate tungsten boride or molybdenum boride, and
   joining said dense body to said carbonaceous anode support by
      introducing a layer of elemental hafnium (Hf) or zirconium (Zr) between said complementary coated surface of said support body and said dense body,
      juxtaposing said complementary surfaces of said dense body and said support, and
      heating to a reaction-brazing temperature under vacuum or an inert atmosphere such that said dense body thereafter strongly adheres to said carbonaceous support body.

2. The method according to claim 1 wherein said mixture contains particles of hafnium carbide or zirconium carbide in an amount at least about 2–3 times the weight of said tungsten boride or molybdenum boride.

3. The method of claim 2 wherein said mixture also contains minor amounts of particulate elemental refractory metal and particulate elemental Reactive metal.

4. The method according to claim 3 wherein said material is the residue of an alcohol slurry containing said boride and carbide particles which have an average particle size of about 50 μm or less, which slurry was coated onto said complementary surface of said carbonaceous support body which is graphite, and wherein said coated support body is heated to a reaction-sintering temperature and then cooled to about ambient temperature prior to said juxtaposing step.

5. The method in accordance with claim 3 wherein said particulate mixture consists essentially of between about 14% and 20% by weight of said W boride or Mo boride, between about 45% and 56% by weight of said Hf carbide or Zr carbide and between about 13% and 19% of each of said elemental refractory metal and said elemental Reactive metal.

6. The method in accordance with claim 5 wherein said particulate mixture includes between about 15% and about 19% of Mo boride or W boride and between about 46% and 55% of Hf carbide or Zr carbide.

7. The method according to claim 1 wherein said dense body is of single-crystal material and said carbonaceous support body is a carbon-carbon composite containing carbon fibers that are aligned transverse to the surface to be placed in juxtaposition with said dense body.

8. The method according to claim 1 wherein said layer of elemental Hf or Zr is provided as thin foil, wherein force is applied to press said surfaces into juxtaposition with each other with said foil therebetween, and wherein said reaction-brazing temperature is maintained for a period of at least about 15 minutes.

9. The method according to claim 3 wherein said heating raises the temperature to a temperature which is at or near the eutectic temperature for a solution comprising the metal of said dense body, said metal boride, carbon, said Reactive metal and any compound formed between said Reactive metal and W or Mo.

10. The method according to claim 1 wherein said dense body is a molybdenum or molybdenum alloy body, said boride is Mo boride, said carbide is HfC and said mixture also contains elemental Hf and elemental Mo powder.

11. A method of joining a dense tungsten(W) or molybdenum(Mo) body to a carbonaceous support, which method comprises providing a dense W or Mo metal body, which body has one surface designated for joinder to another body, providing a carbonaceous support body capable of withstanding high temperatures in the absence of air, which support has a surface complementary to said designated surface of said dense body, coating said complementary surface of said support body with a layer of a material comprising a mixture of particles of a refractory metal boride and particles of a metal carbide, providing a Reactive metal layer and juxtaposing said two complementary surfaces with said layer therebetween, and joining said dense body to said coated surface of said carbonaceous support body by heating to a reaction-brazing temperature such that said refractory metal body thereafter strongly adheres to said carbonaceous support while an intermediate barrier forms between said two bodies which thereafter diminishes diffusion of carbon from said support body into said refractory metal body.

12. The method of claim 11 wherein said mixture also contains particulate refractory metal and particulate Reactive metal and wherein said heating raises the temperature to near or at the eutectic temperature for a solution comprising the metal of said dense body, said Reactive metal, carbon, said metal boride and any compound formed between said Reactive metal and said W or Mo.

13. The method according to claim 11 wherein said metal boride is a boride of W, Mo, vanadium(V) or zirconium(Zr) and wherein said metal carbide is a carbide of hafnium(Hf), Zr, Mo or W.

14. The method according to claim 13 wherein said coating material is an alcohol slurry containing particles of tungsten boride or molybdenum boride and hafnium carbide or zirconium carbide having particle size of about 50 μm or less.

15. The method in accordance with claim 14 wherein said Reactive metal layer comprises foil of elemental Hf or Zr and said mixture also includes elemental Hf or Zr powder and elemental Mo or W powder.

16. The method in accordance with claim 15 wherein said coating material includes a particulate mixture which consists essentially of between about 14% and 20% by weight of said metal boride, between about 45% and 56% by weight of said metal carbide, between about 13% and 19% by weight of elemental Hf and/or Zr powders and about 13% to 19% of elemental W or Mo.

17. The method according to claim 11 wherein said carbonaceous support body is graphite or a carbon-carbon composite, and wherein force is applied to press said surfaces into juxtaposition with each other while heating in a vacuum to said reaction-brazing temperature which is maintained for a period of at least about 15 minutes.

18. The method according to claim 11 wherein said dense body is a molybdenum or molybdenum alloy body, said boride is Mo boride, said carbide is HfC and said particulate mixture contains Hf and Mo powder, and wherein said heating is to a temperature of about 1865° C.

19. A method of joining a dense tungsten(W) or molybdenum(Mo) refractory metal body to a carbonaceous support, which method comprises the steps of:

providing a dense W or Mo refractory metal body, which body has one surface designated for joinder to another body, providing a carbonaceous support capable of withstanding high temperatures in the absence of air, which support has a surface complementary to said designated surface of said dense body, coating said complementary surface of said support with a layer of a material comprising a mixture of particles of a boride of the refractory metal of the body and of a Reactive or refractory metal carbide, juxtaposing said two complementary surfaces, and joining said refractory metal body to said coated surface of said carbonaceous support by heating to a reaction-brazing temperature of at least about 2200° C. such that said refractory metal body thereafter strongly adheres to said carbonaceous support and an intermediate barrier forms therebetween which diminishes diffusion of carbon from said support into said refractory metal body both during said joining step and later during use of said body in a high temperature environment.

20. A method of joining a dense molybdenum(Mo) body to a carbonaceous support, which method comprises providing a dense Mo body, having one surface designated for joinder to another body, providing a carbonaceous support body capable of withstanding temperatures at least as high as about 1900° C. in the absence of air, which support has a surface complementary to said designated surface of said dense Mo body, providing Hf or Zr metal foil for positioning adjacent said designated surface, coating said complementary surface of said support body with a layer of a material comprising a mixture of particles of Mo boride, Hf carbide and/or Zr carbide, elemental Mo, and elemental Hf and/or Zr, juxtaposing said two complementary surfaces with said foil therebetween, and joining said dense body to said coated surface of said carbonaceous support body by heating to a temperature at or near the eutectic temperature for a solution comprising Mo, MoB, and Hf and/or Zr and maintaining said temperature for time sufficient for Mo and Hf and/or Zr to form carbides by reaction at the surface of said carbonaceous support body, such that said refractory metal body thereafter strongly adheres to said carbonaceous support while an intermediate barrier that has formed between said two bodies diminishes diffusion of carbon from said support body into said refractory metal body.

* * * * *

UNITED STATES PATENT AND TRADEMARK OFFICE
CERTIFICATE OF CORRECTION

PATENT NO.    : 6,554,179 B2
DATED         : April 29, 2003
INVENTOR(S)   : Horner et al.

It is certified that error appears in the above-identified patent and that said Letters Patent is hereby corrected as shown below:

<u>Title page,</u>
Item [75], Inventors, change the city and state of the inventor "Peter G. Valentine" from "San Diego, CA" to -- Huntsville, AL --.

Signed and Sealed this

Thirtieth Day of March, 2004

JON W. DUDAS
*Acting Director of the United States Patent and Trademark Office*